(12) United States Patent
Russo

(10) Patent No.: US 11,733,053 B1
(45) Date of Patent: Aug. 22, 2023

(54) METHOD AND APPARATUS FOR ALERTING AN OPERATOR OF A CARBON IMPACT

(71) Applicant: PITT-OHIO, Pittsburgh, PA (US)

(72) Inventor: Justine A. Russo, Pittsburgh, PA (US)

(73) Assignee: PITT-OHIO, Pittsburgh, PA (US)

( * ) Notice: Subject to any disclaimer, the term of this patent is extended or adjusted under 35 U.S.C. 154(b) by 0 days.

(21) Appl. No.: 17/981,034

(22) Filed: Nov. 4, 2022

(51) Int. Cl.
*G01C 21/34* (2006.01)
*B60W 50/14* (2020.01)

(52) U.S. Cl.
CPC ......... *G01C 21/3469* (2013.01); *B60W 50/14* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 7,580,808 B2* | 8/2009 | Bos | ......................... | G07C 5/085 |
| | | | | 73/23.31 |
| 8,498,818 B1* | 7/2013 | Jones, Jr. | ............. | G06Q 10/083 |
| | | | | 702/182 |
| 9,824,365 B2* | 11/2017 | Bradley | ................... | B67D 7/42 |
| 2009/0069999 A1* | 3/2009 | Bos | ........................ | G07C 5/008 |
| | | | | 701/33.4 |
| 2010/0073158 A1* | 3/2010 | Uesaka | ..................... | B60Q 9/00 |
| | | | | 340/450.2 |
| 2016/0203435 A1* | 7/2016 | Waltniel | ......... | G06Q 10/063118 |
| | | | | 705/7.17 |
| 2017/0351978 A1* | 12/2017 | Bellowe | ................. | G06Q 50/01 |
| 2020/0049523 A1* | 2/2020 | Kato | ................... | G01C 21/3423 |
| 2020/0200649 A1* | 6/2020 | Ammoura | ............. | B60W 40/09 |
| 2020/0202645 A1* | 6/2020 | Gintz | ................... | G07C 5/0825 |
| 2020/0372588 A1* | 11/2020 | Shi | ......................... | G06Q 50/06 |
| 2021/0224819 A1* | 7/2021 | Silverstein | ............. | G06Q 50/04 |
| 2022/0067751 A1* | 3/2022 | Sanchez | .............. | G06F 16/9535 |
| 2022/0177987 A1* | 6/2022 | Amano | ..................... | C21C 5/35 |
| 2023/0008123 A1* | 1/2023 | Sanchez | ................ | G06Q 10/00 |
| 2023/0015077 A1* | 1/2023 | Kim | .................. | G01C 21/3461 |

* cited by examiner

*Primary Examiner* — Ryan Rink
(74) *Attorney, Agent, or Firm* — Caldwell Intellectual Property Law, LLC

(57) ABSTRACT

An apparatus and method for alerting an operator of a carbon impact is disclosed. The apparatus may include at least a processor, and a memory communicatively connected to the at least a processor. The memory contains instructions configuring the at least a processor to receive operation data of transport vehicle, calculate carbon emission data, wherein calculating carbon emission data includes classifying carbon emissions data to one or more carbon emissions groups and comparing carbon emission data to a preconfigured operational threshold. The memory further contains instructions configuring the at least a processor to display alert related to carbon emissions data as presentation content.

14 Claims, 6 Drawing Sheets

METHOD AND APPARATUS FOR ALERTING AN OPERATOR OF A CARBON IMPACT

FIELD OF THE INVENTION

The present invention generally relates to the field of carbon emissions tracking. In particular, the present invention is directed to a method and apparatus for alerting an operator of a carbon impact.

BACKGROUND

Greenhouse gas emissions from transportation are the largest contributor of the United States greenhouse gas emissions. Carbon dioxide resulting from the combustion of petroleum-based products in transportations engine makes up the vast majority of the greenhouse gas including methane and nitrous oxide. Thus, carbon emissions tracking of vehicles is valuable to reduce greenhouse gas emissions. Existing carbon emissions tracking solutions are not sufficient for the problem.

SUMMARY OF THE DISCLOSURE

In an aspect, an apparatus for alerting an operator of a carbon impact, the apparatus including at least a processor and a memory communicatively connected to the at least a processor, the memory containing instructions configuring the at least a processor to receive operation data of a transport vehicle. The memory containing instructions further configuring the at least a processor to calculate carbon emissions data based on the operation data. The memory containing instructions further configuring the at least a processor to classify the carbon emissions data to one or more carbon emissions groups using a classification model. The memory containing instructions further configuring the at least a processor to compare the carbon emissions data in the one or more carbon emissions groups to a preconfigured operational for each of the one or more carbon emissions groups. The memory containing instructions further configuring the at least a processor to display an alert related to the carbon emissions data as presentation content, as a function of the comparison.

In another aspect a method for alerting the operator of the carbon impact, the method including receiving, using at least a processor, the operation data of the transport vehicle. The method further including calculating, using the at least a processor, carbon emissions data based on the operation data. The method further including classifying, using the at least a processor, the carbon emissions data to one or more carbon emissions groups using a classification model. The method further including comparing, using the at least a processor, the carbon emissions data in the one or more carbon emissions groups to a preconfigured operational threshold for each of the one or more carbon emissions groups. The method further including displaying, using the at least a processor, an alert related to the carbon emissions data as presentation content, as a function of the comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for tracking carbon emissions of transport vehicle. In an embodiment, carbon emissions data may be calculated from one or more operation data. In an embodiment, operation data may be obtained from one or more sensors of a transport vehicle.

Aspects of the present disclosure can be used to calculate carbon emissions ratio in a relationship of carbon emissions data and operation data. Aspects of the present disclosure can also be used to classify carbon emissions data into one or more caron emission groups using a classification model.

Aspects of the present disclosure allow for displaying alert of a comparison relating to carbon emissions data and preconfigured operational data. In some embodiments, an alert may be triggered when the carbon emissions data exceeds preconfigured operational threshold. Exemplary embodiments illustrating aspects of the present disclosure are described below in the context of several specific examples.

Figure 1:
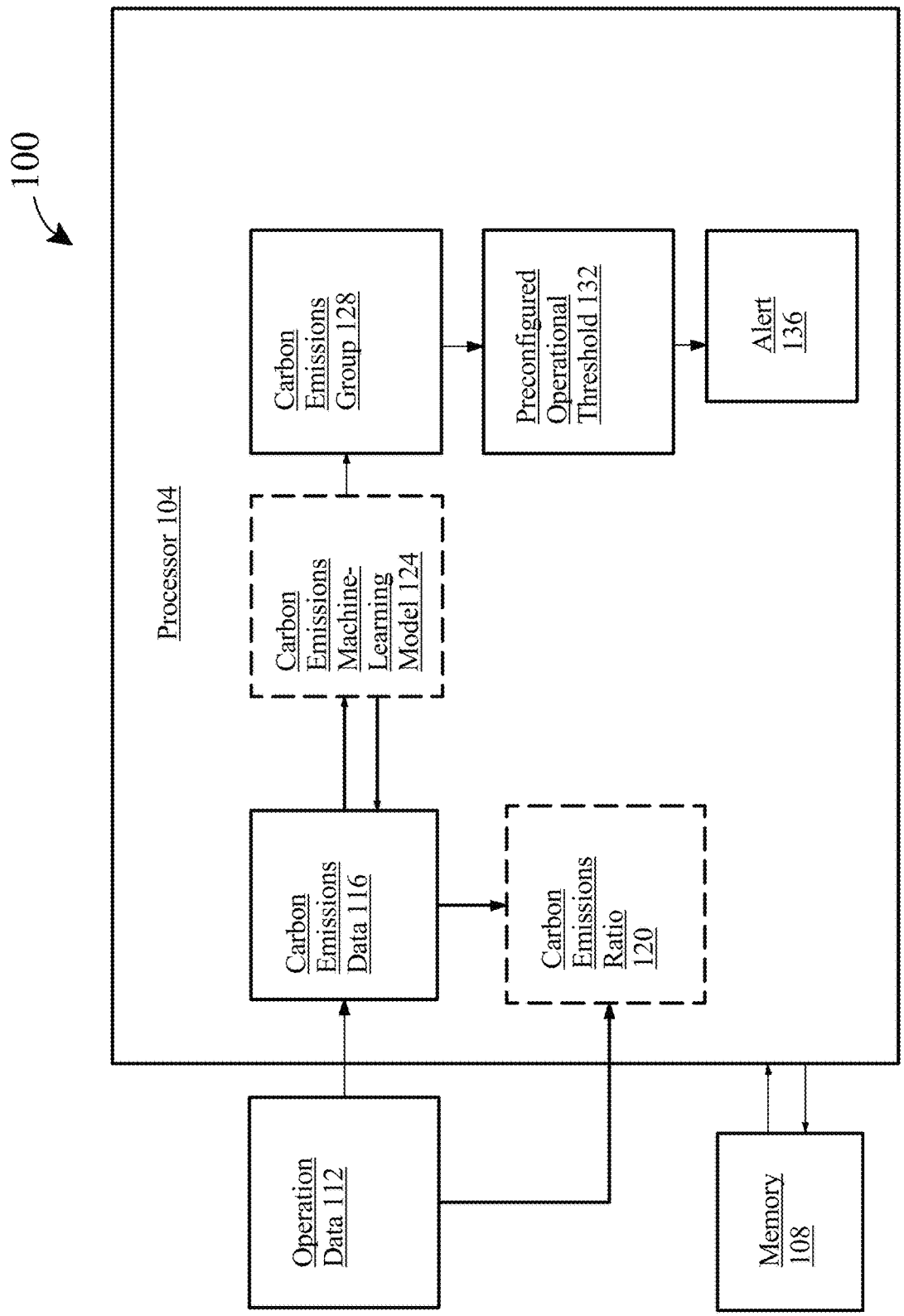
FIG. 1 is a block diagram of an exemplary embodiment of an apparatus for tracking a carbon impact.

Referring now to FIG. 1, an exemplary embodiment of an apparatus 100 alerting an operator of a carbon impact of a transport vehicle is illustrated. Apparatus 100 includes a processor 104. The processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. The processor 104 may include a single computing device operating independently, or may include two or more computing device operating in concert, in parallel, sequentially or the like; two or more computing devices may be included together in a single computing device or in two or more computing devices. The processor 104 may interface or communicate with one or more additional devices as described below in further detail via a network interface device. Network interface device may be utilized for connecting the processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The processor 104 may include but is not limited to, for example, a computing device or cluster of computing devices in a first location and a second computing device or cluster of computing devices in a second location. The processor 104 may include one or more computing devices dedicated to data storage, security, distribution of traffic for load balancing, and the like. The processor 104 may distribute one or more computing tasks as described below across a plurality of computing devices of computing device, which may operate in parallel, in series, redundantly, or in any other manner used for distribution of tasks or memory between computing devices. The processor 104 may be implemented using a "shared nothing" architecture in which data is cached at the worker, in an embodiment, this may enable scalability of system 100 and/or computing device.

Still referring to FIG. 1, the processor 104 may be designed and/or configured to perform any method, method step, or sequence of method steps in any embodiment described in this disclosure, in any order and with any degree of repetition. As a non-limiting example, the processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 contains a memory 108 communicatively connected to the at least a processor 104. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, the memory 108 contains instructions configuring the processor 104 to receive operation data 112 of a transport vehicle. For the purposes of this disclosure, "operation data" is data relating to the use of a transport vehicle by an operator. For the purposes of this disclosure, an "operator" is a person that uses or controls a transport vehicle. As a non-limiting example, an operator may be a truck driver, a boat pilot, a plane pilot, a biker, a courier and the like. For the purposes of this disclosure, a "transport vehicle" is a machine capable of moving one or more objects between one or more locations. As a non-limiting example, the transport vehicle may include a freight carrier, a truck, a car, a boat, a plane, a motorcycle, a non-motorized bicycle, and the like. As a non-limiting example, an object may include cargo, goods, livestock, non-fungible goods, fungible goods, produce, cargo containers, oil, liquids, gasoline, food, meals, people, products, and the like. The transport vehicle may be configured to operate through air, land, sea, and/or the like. The transport vehicle may be configured to engage in one or more steps of a transport. In some embodiments, a transport vehicle may engage in pickup, delivery, and/or line haul operations. In some embodiments, a transport vehicle may include, but is not limited to, less than Truckload ("LTL") and/or Full Truckload ("FTL") freight delivery.

Still referring to FIG. 1, operation data 112 may include, as non-limiting examples, transportation data, operator data, and manufacturing data, and the like. As used in the current disclosure, "transportation data" is data related movement of goods, services, and/or equipment by a transport vehicle. This may include moving goods, services, and or equipment from a first location to a second location. The movement of goods may occur via ground, water, air transport, or any combination thereof. Examples of transportation data may the medium of transportation, duration of transportation, distance of transportation, transport routes, fuel usage during transport, and the like. As used in the current disclosures, a "manufacturing data" is data that is related the manufacturing of goods or products. The manufacture of a good may include the creation, assembly, and packaging of a good or product. For example, manufacturing datum may include materials used to make a product, number of materials used to make a product, product assembly techniques, product packaging used, equipment used to produce a product, weights of pay-load, packing specifications, traffic data, weather data, and the like. As used in the current disclosures, "operator data" is data that is related the actions of the of an operator. An operator may include any person who aids in the creation, manufacture, transportation, and/or delivery of goods and services. Examples of operators may include product manufacturing workers, product transportation work, product testers, and the like. Examples of operator data may include the number of man-hours used create a product, the speed at which a product is transported, the efficiency of the operator, and the like.

Still referring to FIG. 1, in some embodiments, operation data 112 may include transport statistics from one or more sensors of the transport vehicle. For the purposes of this disclosure, "transport statistic" is a statistic relating to the use of a transport vehicle. In some embodiments, transport statistics may include idle times of the transport vehicle, hard turns of the transport vehicle, quick acceleration of the transport vehicle, hard stops of the transport vehicle, fuel used of the transport vehicle, and the like. For the purposes of this disclosure, "idle time" of the transport vehicle is a period when a vehicle's engine is running, but not moving to its destination, unnecessarily consuming fuel. For the purposes of this disclosure, "hard turn" of a transport vehicle is an abrupt turn of a transport vehicle. For the purposes of this disclosure, "hard stop" of a transport vehicle is an abrupt stop of a transport vehicle. For the purposes of this disclosure, "quick acceleration" is an abrupt starting of an engine of a transport vehicle.

Still referring to FIG. 1, in some embodiments, operation data 112 may include fuel consumption. For the purposes of this disclosure, "fuel consumption" is amount of fuel of a vehicle consumed in driving a given distance. As a non-limiting example, fuel data may include an amount of fuel burned by a transport vehicle. Fuel may include, but is not limited to, gasoline, diesel, propane, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, biofuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle.

Still referring to FIG. 1, in some embodiments, operation data 112 may include a transport route, transport time, transport component weight, packaging type, packaging weight, and the like. "Transport routes", for the purposes of this disclosure, is a planned and/or developed path by which all types of transport can be channeled. As a non-limiting example, a transport route is a path from Ronks, Pennsylvania to Mount Joy, Pennsylvania. "Transport time", for the purposes of this disclosure, is total time a transport vehicle takes to get from origin to destination. "Transport component weight", for the purpose of this disclosure, is a mass of a transport vehicle. "Packaging type", for the purpose of this disclosure, is a kind of materials used to wrap or protect goods. "Packaging weight", for the purpose of this disclosure, is a mass of materials used to wrap or protect goods.

Still referring to FIG. 1, the memory 108 contains instructions configuring the processor 104 to receive operation data 112 of a transport vehicle. In some embodiments, the processor 104 may receive the operation data 112 from a database. "Database", for the purposes of this disclosure, is an organized collection of data stored and accessed electronically. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, the processor 104 may receive the operation data 112 detected by one or more sensors. In some embodiments, the one or more sensors may be located on a transport vehicle. For the purposes of this disclosure, a "sensor" is a device that is configured to detect an input and/or a phenomenon and transmit information related to the detection. In some embodiments, sensors may be communicatively connected to processor 104. In some embodiments, a sensor may be used to measure carbon emissions. In some embodiments, a sensor may transduce a detected phenomenon and/or characteristic, such as without limitation, temperature, voltage, pressure, and the like, into a sensed signal. Sensors may include one or more sensors which may be the same, similar, or different. In some embodiments, and without limitation, sensor may include a plurality of sensors. In some embodiments, and without limitation, sensor may include one or more temperature sensors, voltmeters, current sensors, hydrometers, infrared sensors, nondispersive infrared (NDIR) sensors, photoelectric sensors, ionization smoke sensors, motion sensors, speed gauges, pressure sensors, radiation sensors, level sensors, imaging devices (e.g., visible light camera or infrared camera), moisture sensors, Ohm sensor, gas and chemical sensors, flame sensors, electrical sensors, force sensors, Hall sensors, any combination thereof, and the like. The sensor may be a contact or a non-contact sensor. In some embodiments, one or more sensors may be connected to steering wheels, tires, exhaust pipes, suspensions, and the like of a transport vehicle. In some embodiments, transport route may include a path on land, in water, or in air. In some embodiments, one or more sensors may be a contact or a non-contact sensor. In some embodiments, the sensor may transmit/receive signals to/from computing device. Signals may include electrical, electromagnetic, visual, audio, radio waves, or another undisclosed signal type alone or in combination. A sensor may be located within a transport vehicle or a user device. A user device includes a tablet, laptop, smartphone, and the like. A sensor may also be located on the interior or exterior of a transport vehicle. In some embodiments, processor 104 may receive operation data 112 from the sensor using wireless communication, such as, as non-limiting examples, Wi-Fi, Bluetooth, 3G, 4G, LTE, 5G, cellular data, cellular networks, NFC, radio, and the like.

Still referring to FIG. 1, the sensor may include a plurality of independent sensors, where any number of the described sensors may be used to detect any number of physical or electrical quantities associated with a transport, such as a transport factor of a transport. Independent sensors may include separate sensors measuring physical or electrical quantities that may be powered by and/or in communication with circuits independently, where each may signal sensor output to a computing device 104 such as a graphical user interface (GUI). In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of the sensor to detect phenomenon may be maintained.

Still referring to FIG. 1, the sensor may include a motion sensor. A "motion sensor", for the purposes of this disclosure, refers to a device or component configured to detect physical movement of an object or grouping of objects. For example, and without limitation, motion sensor may detect the movement of vehicle or objects being transported by vehicle, such as, for example, during an unloading or loading process of transport. One of ordinary skill in the art would appreciate, after reviewing the entirety of this disclosure, that motion may include a plurality of types including, but not limited to: spinning, rotating, oscillating, gyrating, jumping, sliding, reciprocating, displacing, or the like. The sensor may include, torque sensor, gyro meter (e.g., gyroscope), accelerometer, magnetometer, inertial measurement unit (IMU), pressure sensor, force sensor, proximity sensor, displacement sensor, vibration sensor, LIDAR sensor, and the like thereof. In a nonlimiting embodiment, the sensor ranges may include a technique for the measuring of distances or slant range from an observer including the sensor to a target which may include a plurality of outside parameters. An "outside parameter," for the purposes of this disclosure, refers to environmental factors or physical vehicle factors that may be further captured by the sensor. Outside parameter may include, but is not limited to, air density, air speed, true airspeed, relative airspeed, current patterns, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of vehicle itself, including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, speed, debris, among others. Environmental parameters may be stored in any suitable datastore consistent with this disclosure. Technique may include the use of active range finding methods which may include, but not limited to, light detection and ranging (LIDAR), radar, sonar, ultrasonic range finding, and the like. LIDAR systems may include, but are not limited to, a laser, at least a phased array, at least a microelectromechanical machine, at least a scanner and/or optic, a photodetector, GPS, and the like. In a non-limiting embodiment, the sensor including a LIDAR system may targe an object with a laser and measure the time for at least a reflected light to return to the LIDAR system. LIDAR may also be used to make digital 4D representations of areas on the earth's surface and ocean bottom, due to differences in laser return times, and by varying laser wavelengths. In a nonlimiting embodiments, LIDAR system may include a topographic LIDAR and a bathymetric LIDAR, wherein the topographic LIDAR that may use near-infrared laser to map a plot of a land or surface representing a potential checkpoint or travel route of vehicle while the bathymetric LIDAR may use water-penetrating green light to measure seafloor and various water level elevations within and/or surrounding destination or route.

Still referring to FIG. 1, in some embodiments, the sensor may include a proximity sensor. A "proximity sensor," for the purpose of this disclosure, is a sensor configured to detect the presence of objects. In a nonlimiting embodiment, proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In a nonlimiting embodiment, proximity sensor may be configured to detect the presence of an object disposed within vehicle.

Still referring to FIG. 1, in some embodiments, the sensor may include a pressure sensor. A "pressure", for the purposes of this disclosure, is a measure of force required to stop a fluid from expanding and is usually stated in terms of force per unit area. In nonlimiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, a pressure sensor may be configured to transform a pressure into an analogue electrical signal. In some embodiments, pressure sensor may be configured to transform a pressure into a digital signal.

Still referring to FIG. 1, in some embodiments, the sensor may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

Still referring to FIG. 1, in some embodiments, the sensor may include electrical sensors. "Electrical sensor", for the purposes of this disclosure, may be configured to measure voltage across a component, electrical current through a component, and resistance of a component. In one or more embodiments, the sensor may include thermocouples, thermistors, thermometers, infrared sensors, resistance temperature sensors (RTDs), semiconductor based integrated circuits (ICs), a combination thereof, or another undisclosed sensor type, alone or in combination. "Temperature", for the purposes of this disclosure, is a measure of the heat energy of a system. "\Temperature, as measured by any number or combinations of sensors present within the sensor, may be measured in Fahrenheit (° F.), Celsius (° C.), Kelvin (° K), or another scale alone or in combination. The temperature measured by sensors may include electrical signals, which are transmitted to their appropriate destination wireless or through a wired connection. In some embodiments, the sensor may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like.

Still referring to FIG. 1, in some embodiments, the sensor may generate a sensor signal (also referred to in this disclosure as a "signal") related to detections. Signals may include electrical, electromagnetic, visual, audio, radio waves, or another undisclosed signal type alone or in combination. Any data or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The sensor may include circuitry, computing devices, electronic components or a combination thereof that translates sensor detections into at least an electronic signal configured to be transmitted to another electronic component, such as computing device 104. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e. quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e. a stochastic process), utilizing statistical properties. For instance, in some embodiments, a signal may be modeled with a probability distribution indicating noise, which then may be used to reduce noise in a processed signal.

Still referring to FIG. 1 in some embodiments, operation data 112 may include greenhouse gas data associated with an operator. "Greenhouse gas data" as used in this disclosure is a metric associated with a pollutant that contributes to the greenhouse effect. A "pollutant" as used in this disclosure is a substance that degrades environmental quality. In some embodiments, greenhouse gas data may include, but is not limited to, carbon emissions, water vapor, methane, nitrous oxide, ozone, chlorofluorocarbons, hydrofluorocarbons, perfluorocarbons, and the like. Greenhouse gas data may include measurements associated with an amount of greenhouse gas generated. Carbon emission datum may include an amount of greenhouse gas generated. An amount of greenhouse gas generated may be represented in, but is not limited to, metric tons, pounds, kilograms, cubic meters, and the like. As a non-limiting example, greenhouse gas data may include data showing 4 metric tons of carbon have been generated by an operator. In some embodiments, greenhouse gas data may include data from one or more pollutant sources. A "pollutant source" as used in this disclosure is any originating source of a pollutant. A pollutant source may include, but is not limited to, transport vehicles, power grids, combustion from boilers, furnaces, transport vehicle emissions, emissions from processes performed by or products manufactured by a transport vehicle, and the like. Greenhouse gas data may be consistent with any greenhouse gas data disclosed in U.S. patent application Ser. No. 17/749, 535, filed on May 20, 2022, and entitled "SYSTEM AND METHOD FOR GREENHOUSE GAS TRACKING," the entirety of which is incorporated by reference herein in its entirety.

Still referring to FIG. 1, the memory 108 contains instructions configuring the processor 104 to calculate carbon emissions data 116 based on the operation data 112. For the purposes of this disclosure, "carbon emissions data" is data relating to the emissions of carbon dioxide of a transport vehicle. In some embodiments, carbon emissions data 116 may be associated with activities undertaken in supplying an item from a starting point to a destination using a transport vehicle. As a non-limiting example, the activities may include terrain, driver and vehicle type used for delivery, quantity or dimensions of transported goods, fuel type, environmental conditions, fuel consumed by the transport vehicle, and the like.

Still referring to FIG. 1, in some embodiments, carbon emissions data 116 may be calculated from fuel consumption data, which may include the amount of fuel consumed over a period of time while engaging in a transportation. As a non-limiting example, the period of time may be the last 3 days, 1 week, 3 months, 2 years, 1 day, 3 hours and the like. In some embodiments, the period of time may be the period of time it took to complete a particular transportation. As a non-limiting example, if a transportation took 5 hours to complete, the period of time may correspond to those 5 hours. In some embodiments, a transportation may be the transportation that is to be done or has been done by an operator. In some embodiments, a transportation may be a job for an operator, which includes moving one or more objects from one location to another.

Still referring to FIG. 1, in some embodiments, carbon emissions data 116 may be calculated from mileage data. For the purposes of this disclosure, "mileage data" is data pertaining to a number of miles traversed by a transport vehicle. Mileage data may be measured in miles, kilometers, feet, yards, furlongs, leagues, and/or any other suitable distance unit. Mileage data may be measured over a period of time. The period of time may be, as a non-limiting example, the career of an operator. As another non-limiting example, the period of time may be the last 3 days, 1 week, 3 months, 2 years, and the like. As another non-limiting example, the period of time may be the period of time it took to complete a particular transportation. As a non-limiting example, if a transportation took 5 hours to complete, the period of time may correspond to those 5 hours. In some embodiments, other types of data may be used to calculate carbon emission datum such as type of fuel, idling time, traffic data, and the like. A person of ordinary skill in the art would appreciate, after having reviewed the entirety of this disclosure, that a variety of data could be used in addition to or in place of the data mentioned here in order to calculate the carbon emission datum.

With continued reference to FIG. 1, in some embodiments, carbon emissions data 116 may be calculated using a lookup table. A "lookup table," for the purposes of this disclosure, is an array of data that maps input values to output values. A lookup table may be used to replace a runtime computation with an array indexing operation. As a non-limiting example, a carbon emission lookup table may relate fuel consumption data to carbon emission datum. As a non-limiting example, computing device may be configured to "lookup" a given fuel consumption datum in order to find a corresponding carbon emission datum. As a non-limiting example, computing device may be configured to "lookup" a given mileage datum in order to find a corresponding carbon emission datum.

Still referring to FIG. 1, carbon emissions data 116 may be calculated as a function of the amount of fuel that is consumed. In a non-limiting example, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). Carbon emissions data 116 also be generated as a function of energy generated from the fuel. In a non-limiting example, the mass of carbon dioxide that is released when one MJ of energy is released from fuel can be estimated to a good approximation. For the chemical formula of diesel, we use as an approximation $C_nH_{2n}$. Note that diesel is a mixture of different molecules. As carbon has a molar mass of 12 g/mol and hydrogen has a molar mass of about 1 g/mol, so the fraction by weight of carbon in diesel is roughly 12/14. The reaction of diesel combustion is given by:

$$2C_nH_{2n} + 3nO_2 \leftrightarrows 2nCO_2 + 2nH_2O$$

Carbon dioxide has a molar mass of 44 g/mol as it consists of 2 atoms of oxygen (16 g/mol) and 1 atom of carbon (12 g/mol). So, 12 g of carbon yield 44 g of Carbon dioxide. Diesel has an energy content of 42.6 MJ per kg, or 23.47 gram of Diesel contain 1 MJ of energy. Putting everything together the mass of carbon dioxide that is produced by releasing 1 MJ of energy from diesel fuel can be calculated as:

$$23.47 \text{ g} \frac{\text{Diesel}}{\text{MJ}} * \frac{12}{14} * \frac{44}{12} = 74 \text{ g (Carbon Dioxide)/MJ}$$

For gasoline, with 22 g/MJ and a ratio of carbon to hydrogen atoms of about 6 to 14, the estimated value of carbon emission for 1 MJ of energy is:

$$22 \text{ g} \frac{\text{gasoline}}{\text{MJ}} * \frac{6*12}{6*12+14*1} * \frac{44}{12} = 67.5 \text{ g (Carbon Dioxide)/MJ}$$

Mass of carbon dioxide emitted per quantity of energy for various fuels

| Fuel name | $CO_2$ emitted (lbs./$10^6$ Btu) | $CO_2$ emitted (g/MJ) | $CO_2$ emitted (g/kWh) |
|---|---|---|---|
| Natural gas | 117 | 50.30 | 181.08 |
| Liquefied petroleum gas | 139 | 59.76 | 215.14 |
| Propane | 139 | 59.76 | 215.14 |
| Aviation gasoline | 153 | 65.78 | 236.81 |
| Automobile gasoline | 156 | 67.07 | 241.45 |
| Kerosene | 159 | 68.36 | 246.10 |
| Fuel oil | 161 | 69.22 | 249.19 |
| Tires/tire derived fuel | 189 | 81.26 | 292.54 |
| Wood and wood waste | 195 | 83.83 | 301.79 |
| Coal (bituminous) | 205 | 88.13 | 317.27 |
| Coal (sub-bituminous) | 213 | 91.57 | 329.65 |
| Coal (lignite) | 215 | 92.43 | 332.75 |
| Petroleum coke | 225 | 96.73 | 348.23 |
| Coal (anthracite) | 227 | 97.59 | 351.32 |

Still referring to FIG. 1, in some embodiments, the processor 104 may be configured to calculate a carbon emissions ratio 120. For the purposes of this disclosure, "carbon emissions ratio" is a quantitative relation relating to a relationship between the operation data 112 and the carbon emissions data 116. As a non-limiting example, the operation data 112 of transport time and the carbon emissions data 116 of volumes of carbon emitted by transportation time can be used to calculate carbon emissions ratio 120. As another non-limiting example, carbon emissions data 116 of periods of time of carbon emissions and another carbon emissions data 116 of frequencies of carbon emissions can be used to calculate carbon emissions ratio 120. In some embodiments, carbon emissions ratio 120 may be used to identify carbon emissions data 116 from indirect carbon emissions sources. For the purposes of this disclosure, an "indirect carbon emissions source" is a source that does not directly cause carbon dioxide emissions. As non-limiting examples, the indirect carbon emission source may include warehouse equipment usage, electricity usage of a transport vehicle, packaging materials of goods in a transport vehicle, and the like. For the purposes of this disclosure, "warehouse equipment" is a machinery moving one or more materials around a warehouse. As non-limiting examples, warehouse equipment may include order picker forklifts, reach trucks, automated storage and retrieval machine, and the like. In some embodiments, carbon emissions ratio 120 may be used to extrapolate carbon emissions data 116 from indirect carbon emission sources. As a non-limiting example, carbon emissions ratio 120 of the volumes of carbon emitted by idling periods may estimate carbon emissions data 116 of volumes of carbon emitted by different idling period.

Still referring to FIG. 1, in some embodiments, carbon emissions data 116 may be generated as a function of a carbon emissions machine-learning model 124 that may be trained with training data correlating operation data 112 to carbon emissions data 116. For the purposes of this disclosure, "training data" is data containing correlations that a machine-learning process may use to model relationships between two or more categories of data elements. In some embodiments, training data may be received from operation data database. Training data may include examples of operation data 112 correlated to carbon emissions data 116. In some embodiments, the corresponding carbon emissions data 116 for the operation data 112 in the training data may be manually calculated, for example, by a human. In some embodiments, as a non-limiting example, training data may include transportation data, such as transport routes, transport times and transport statistics. Carbon emissions data 116 may be calculated using any method for calculating carbon emission data disclosed in patent application Ser. No. 17/945,603, filed on Sep. 15, 2022, and entitled "A METHOD AND APPARATUS FOR COMPARING THE EFFICIENCY OF OPERATORS," the entirety of which is incorporated by reference herein in its entirety.

Still referring to FIG. 1, memory 108 contains instructions configuring the processor 104 to classify the carbon emissions data 116 to one or more carbon emissions groups 128 using a carbon emissions machine-learning model 124. For the purposes of this disclosure, "carbon emissions group" is a set of associative carbon emissions data. In some embodiments, carbon emissions group 128 may include groups including carbon emissions data 116 of transportation data. As a non-limiting example, carbon emissions group 128 may be groups of average volumes of carbon emitted using specific transport routes. As a non-limiting example, carbon emissions group 128 may be groups of average volumes of carbon emissions of hard turns. In some embodiments, carbon emissions group 128 may include groups including carbon emissions data 116 of manufacturing data. As a non-limiting example, carbon emissions group 128 may be groups of carbon emissions data 116 of loading. As a non-limiting example, carbon emissions group 128 may be groups of carbon emissions data 116 of unloading. In some embodiments, carbon emissions group 128 may include groups including one or more magnitudes of carbon contributions. For the purposes of this disclosure, "carbon contribution" is a total amount of carbon dioxide that are directly or indirectly generated by actions of an operator. As a non-limiting example, the carbon emissions group 128 for carbon contribution may be groups of highest carbon contributions, lowest carbon contributions, most frequent carbon contributions, least frequent carbon contributions, and the like. In some embodiments, carbon emissions group 128 may include driving metrics, transport routes, and the like. For the purposes of this disclosure, "driving metric" is a metric that influences driving performance of a transport vehicle. As a non-limiting example, driving metric may include speed of a vehicle, brake control actions of a vehicle, acceleration of a vehicle, and the like. For the purposes of this disclosure, a "carbon emissions machine-learning model" is a machine-learning model, such as a mathematical model, neural net, or program generated by a machine learning algorithm known as a "classification algorithm," that sorts carbon emissions related inputs into categories or bins of data, outputting the categories or bins of data and/or labels associated therewith. In some embodiments, inputs of the carbon emissions machine-learning model 124 may include carbon emissions data 116 correlated to outputs that may include a carbon emissions group 128. As a non-limiting example, inputs of the carbon emissions machine-learning model 124 may include of average volumes of carbon emissions of hard turns correlated to outputs that may include hard turn carbon emissions average volumes group. As a non-limiting example, inputs of the carbon emissions machine-learning model 124 may include carbon emissions data 116 that has been manually labeled by one or more operators to include in a carbon emissions group 128. In some embodiments, carbon emission data 116 may be sorted into one or more carbon emissions group using any method disclosed in patent application Ser. No. 17/945,683, filed on Sep. 15, 2022, and entitled "AN APPARATUS FOR IDENTIFYING AN EXCESSIVE CARBON EMISSION VALUE AND A METHOD FOR ITS USE," the entirety of which is incorporated by reference herein in its entirety.

Still referring to FIG. 1, the memory 108 contains instructions configuring the processor 104 to compare the carbon emissions data 116 in one or more carbon emissions groups 128 to a preconfigured operational threshold 132 for each of the one or more carbon emissions groups 128. For the purposes of this disclosure, a "preconfigured operational threshold" is a value of carbon emissions that is chosen in advance as an upper limitation. As a non-limiting example, there may be a preconfigured operational threshold 132 for hard turns carbon emissions average volumes group. As a non-limiting example, there may be a preconfigured operational threshold 132 for transport routes carbon emissions volumes group. In some embodiments, there may be multiple preconfigured operational thresholds 132. In some embodiments, there may be different preconfigured operational thresholds 132 for each carbon emissions group 128. As a non-limiting example, in some embodiments, a preconfigured operational threshold 132 relating to a carbon emission group 128 for "idling" may be lower than a preconfigured operational threshold 132 for "transport," to reflect the idea that less carbon should be emitted due to idling, as opposed to active transport.

Still referring to FIG. 1, in some embodiments, the preconfigured operational threshold 132 may be set by an operator manually. As a non-limiting example, a truck driver may set a preconfigured operational threshold 132 of volumes of carbon emissions for volumes of carbon emissions during idling of a transport vehicle. As a non-limiting example, an employer may set a preconfigured operational threshold 132 of volumes of carbon emissions for volumes of carbon emissions during idling of a transport vehicle. As a non-limiting example, a truck driver may set a preconfigured operational threshold 132 of average volumes of carbon emissions for average volumes of carbon emissions in packaging weight group. In some embodiments, the preconfigured operational threshold 132 may be set by using previous data of the preconfigured operational threshold 132. For the purposes of this disclosure, "previous data" is data that is received any time before present time. In some embodiments, as a non-limiting example, there may be a preconfigured operational threshold 132 that was generated previously. As a non-limiting example, an aircraft pilot may choose to use a preconfigured operational threshold 132 of volumes of carbon emissions by distance of transportation that was generated in a previous transportation with same transporting conditions, such as the same aircraft and transport objects. As a non-limiting example, a motorcycle biker may choose to use a preconfigured operational threshold 132 of average volumes of carbon emissions in packaging weight group that was generated in a previous transportation.

Still referring to FIG. 1, in some embodiments, the processor 104 may generate the preconfigured operational threshold 132 using a threshold machine-learning model. For the purposes of this disclosure, a "threshold machine-learning model" is a machine-learning model that is configured to calculate upper limits of carbon emissions. In some embodiments, training data of a threshold machine-learning model may include operation data 112 and/or carbon emissions data 116 correlated to outputs that may include a preconfigured operational threshold 132. As a non-limiting example, inputs of a threshold machine-learning model may include idling time, transport route, packaging weight, carbon contribution, frequencies of carbon emissions, volumes of carbon emissions, average volumes of carbon emissions, and the like. As a non-limiting example, outputs of a threshold machine-learning model may include a preconfigured operational threshold 132 of carbon emissions volumes by transport mileage. As a non-limiting example, outputs of a threshold machine-learning model may include a preconfigured operational threshold 132 of carbon contributions of idling.

Still referring to FIG. 1, the memory 108 contains instructions configuring the processor 104 to display an alert 136 related to the carbon emissions data 116 as presentation content, as a function of the comparison. For the purposes of this disclosure, "presentation content" is a content that conveys information to viewers. As a non-limiting example, presentation content may include a running average, previous data, real-time data, and the like. For the purposes of this disclosure, "running average" is average of driving metrics of a transport vehicle. For the purposes of this disclosure, "previous data" is data of a transport vehicle obtained from a previous transportation trip. For the purposes of this disclosure, "real-time data" is data of a transport vehicle obtained in the real-time. In some embodiments, alert 136 may display presentation content in one or more visual or audio formats. As a non-limiting example, presentation format may be in one or more displayable images, graphical representations, animations, videos, audiovisuals, graphs, pie charts, bar charts, trend lines, and the like. In some embodiments, the presentation content may be displayed on multiple windows and/or multiple displays. In some embodiments, the processor 104 may display alert 136 on a mobile display device using a network. As a non-limiting example, the mobile display device may include a mobile phone, smartphone, tablet, laptop, desktop computer, vehicle dashboard, and the like. For the purposes of this disclosure, a "network" consists of two or more computing systems that are linked in order to transport and share data. In some embodiments, the presentation content may include a running average, previous data, real-time data, and the like in one or more visual or audio formats. In some embodiments, alert 136 may inform an operator recommended solutions for a plurality of actions which caused the carbon emissions data 116 to exceed the preconfigured operational threshold 132. For example, alert may say that excessive acceleration, idling time, lengthy transport route, or the like caused carbon emissions data 116 to exceed the preconfigured operational threshold 132. In some embodiments, the plurality of actions may be determined using carbon emissions groups 128. For example, if the carbon emission data 116 that was excessive was classified to "idling" that may indicate that the action that caused the excessive carbon emissions was idling. For example, if the carbon emission data 116 that was excessive was classified to "acceleration" that may indicate that the action that caused the excessive carbon emissions was acceleration. As a non-limiting example, an alert 136 may display an operational threshold 132 with a value or values that may be generated using a carbon emissions machine-learning model 124. As a non-limiting example, an alert 136 may inform an operator to decrease carbon emissions of a transport vehicle by decreasing a rate of acceleration of the transport vehicle.

Figure 2:
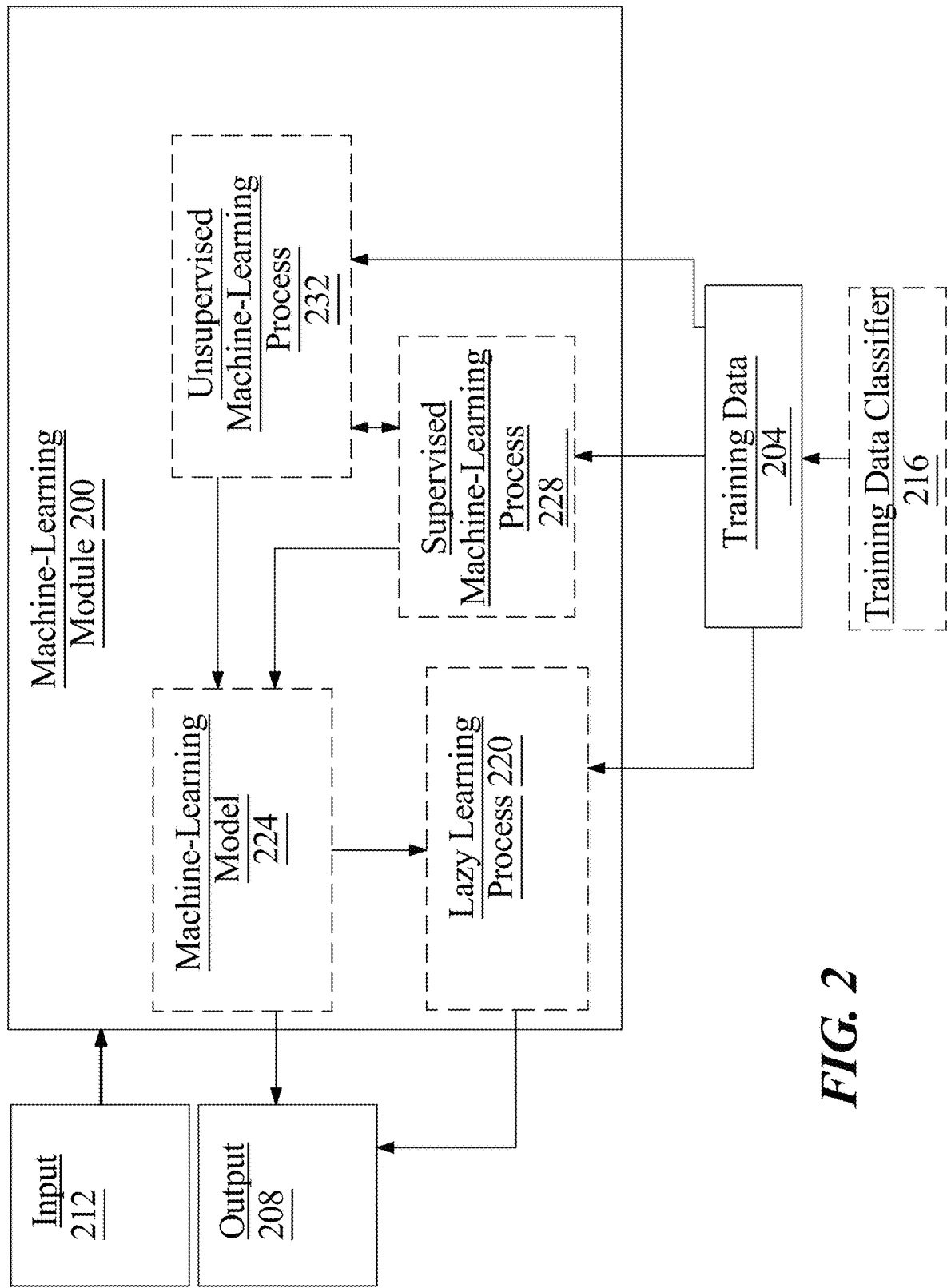
FIG. 2 is a block diagram of an exemplary machine-learning process.

Referring now to FIG. 2, an exemplary embodiment of a machine-learning module 200 that may perform one or more machine-learning processes as described in this disclosure is illustrated. A carbon emission machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting example, a plurality of inputs may include operator data, transportation data, manufacturing data, and the like. As a non-limiting example, a plurality of inputs may include calculated carbon emission data. As a non-limiting example, a plurality of outputs may include carbon emissions data, carbon emission groups of one or more magnitudes of carbon contributions, preconfigured carbon emissions value.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to carbon emissions group.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network including an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include idling time as described above as inputs, total idling time as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
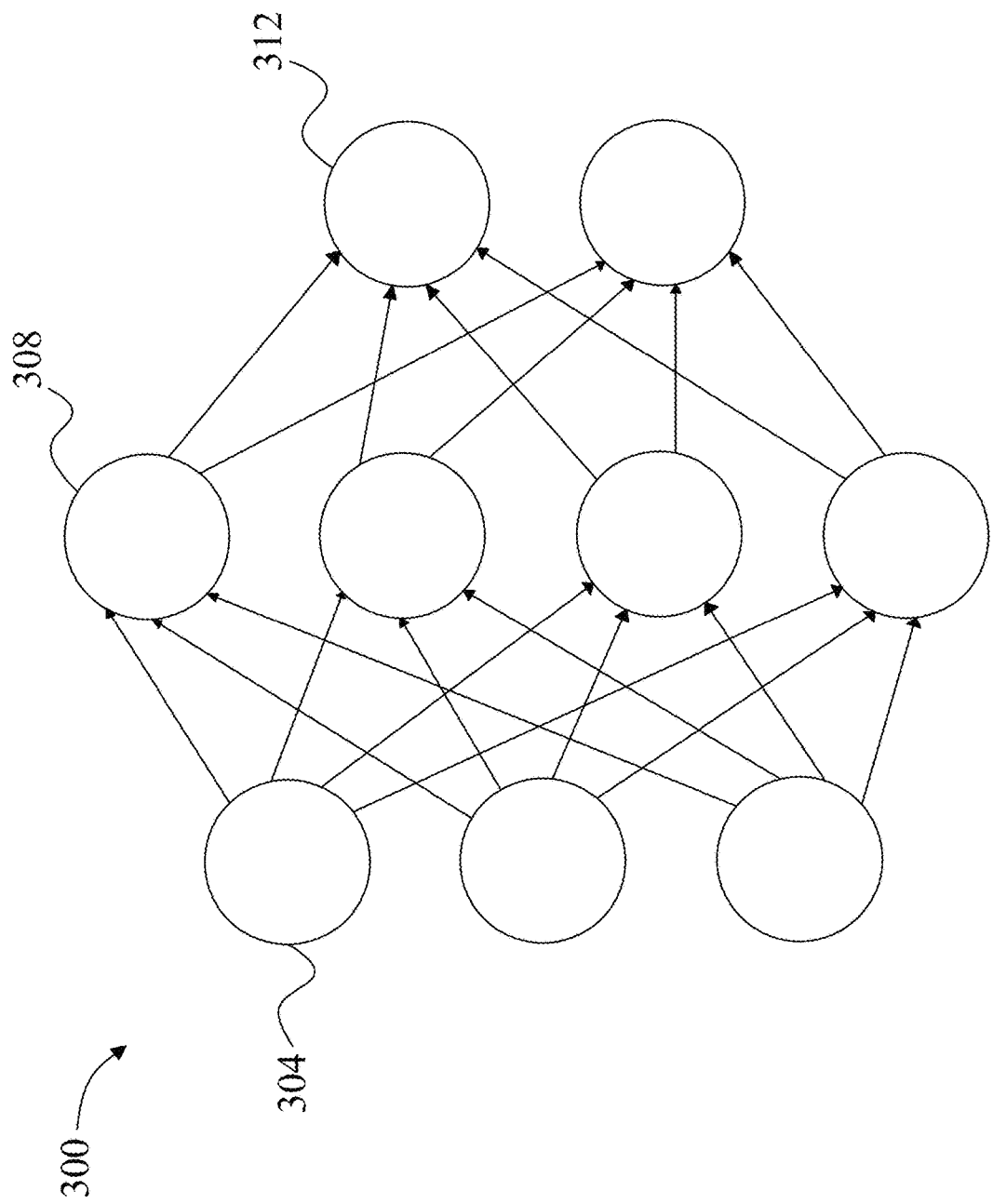
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network including an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
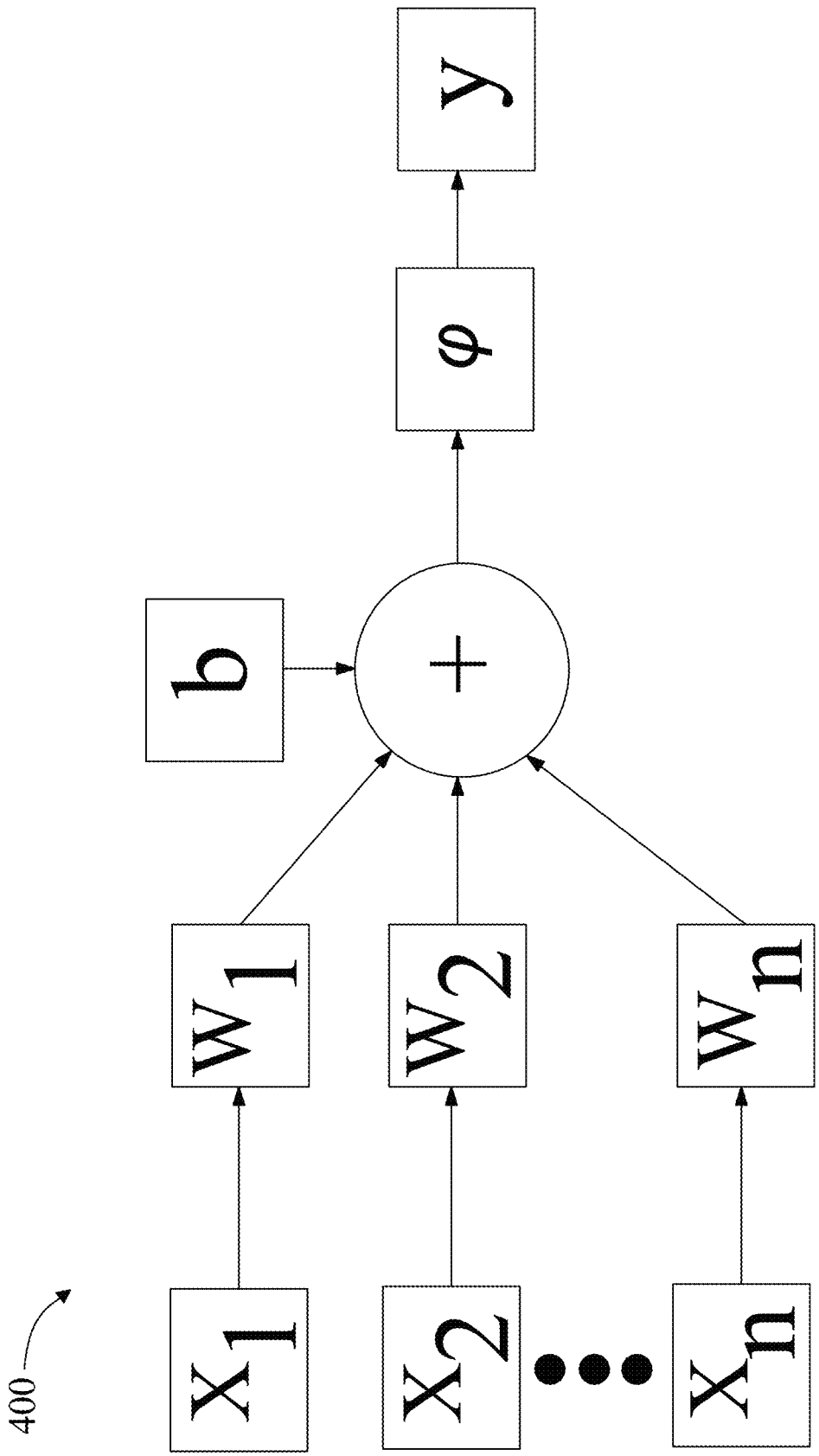
FIG. 4 is a diagram of an exemplary embodiment of a node of a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
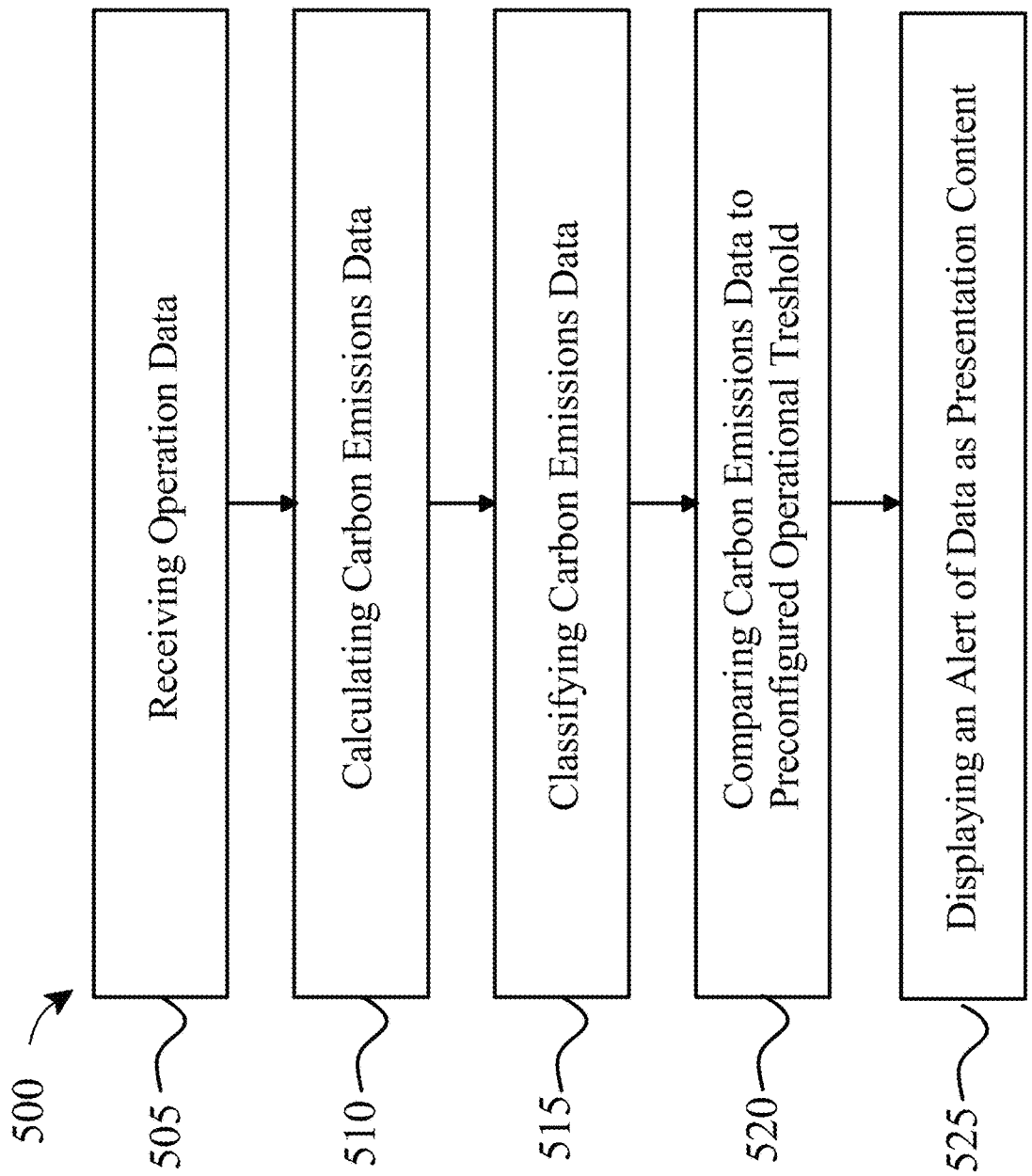
FIG. 5 is a flow diagram illustrating an exemplary workflow in one embodiment of the present invention.

Referring now to FIG. 5, an exemplary embodiment of method 500 is shown. Method 500 includes a step 505 of receiving operation data. Receiving operation data of a transport vehicle may include transport statistics from one or more sensors of the transport vehicle. This may be implemented as disclosed with reference to FIGS. 1-4.

Still referring to FIG. 5, method 500 includes a step 510 of calculating carbon emissions data. Calculating carbon emissions data based on operation data may include calculating a carbon emission ratio relating to a relationship between operation data and the carbon emissions data to extrapolate carbon data from indirect carbon emission sources. Indirect carbon emission sources may include electricity usage. This may be implemented as disclosed with reference to FIGS. 1-4.

Still referring to FIG. 5, method 500 includes a step 515 of classifying carbon emissions data. Classifying carbon emissions data to one or more carbon emissions groups using a carbon emissions machine-learning model 124 may include one or more magnitudes of carbon contributions. This may be implemented as disclosed with reference to FIGS. 1-4.

Still referring to FIG. 5, method 500 includes a step 520 of comparing carbon emissions data to preconfigured operational threshold. Comparing carbon emissions data in the one or more carbon emissions groups to a preconfigured operational threshold for each of the one or more carbon emissions groups may use a threshold machine-learning model to generate the preconfigured operational threshold. This may be implemented as disclosed with reference to FIGS. 1-4.

Still referring to FIG. 5, method 500 includes a step 525 of displaying an alert of data as presentation content. Displaying an alert of data as presentation content, as a function of the comparison may include displaying the alert on a mobile display device using a network. An alert may include a plurality of actions which caused carbon emissions data to exceed the preconfigured operational threshold and may receive instructions on the presentation content for the carbon emissions data. Instructions may include a scope range breakdown of carbon emissions data. This may be implemented as disclosed with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
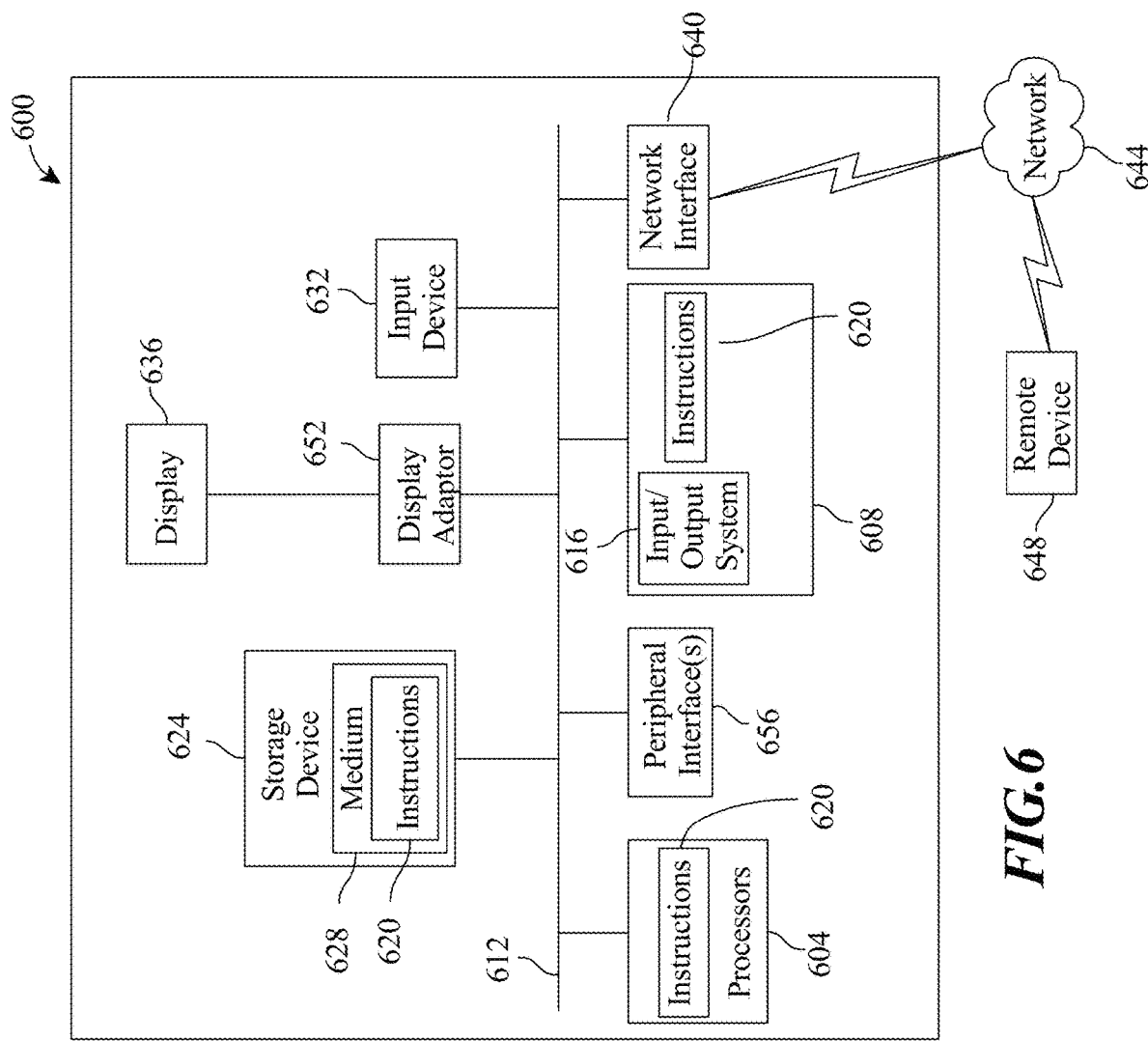
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for alerting an operator of a carbon impact, the apparatus comprising:
  at least a processor; and
  a memory communicatively connected to the at least a processor, the memory containing instructions configuring the at least the processor to:
    receive operation data of a transport vehicle, wherein the operation data comprises transport statistics from at least a sensor connected to a steering wheel of the transport vehicle, wherein the transport statistics include data relating to at least a hard turn of the transport vehicle;
    calculate carbon emissions data based on the operation data;
    classify the carbon emissions data to one or more carbon emissions groups using a carbon emissions machine-learning model;
    compare the carbon emissions data in the one or more carbon emissions groups to a preconfigured operational threshold for each of the one or more carbon emissions groups; and
    display an alert related to the carbon emissions data as presentation content, as a function of the comparison.

2. The apparatus of claim 1, wherein the alert comprises a plurality of actions which caused the carbon emissions data to exceed the preconfigured operational threshold.

3. The apparatus of claim 1, wherein the memory contains instructions configuring the at least the processor to receive instructions on the presentation content for the carbon emissions data.

4. The apparatus of claim 3, wherein the instructions comprise displaying the presentation content as ranges of the carbon emissions data.

5. The apparatus of claim 1, wherein the carbon emissions groups comprise one or more magnitudes of carbon contributions.

6. The apparatus of claim 1, wherein displaying the alert comprises displaying the alert on a mobile display device using a network.

7. The apparatus of claim 1, wherein the memory contains instructions configuring the at least one processor to generate the preconfigured operational threshold using a threshold machine-learning model.

8. A method for alerting an operator of a carbon impact, the method comprising:
   receiving, using at least one processor, the operation data of the transport vehicle,
      wherein the operation data comprises transport statistics from at least a sensor connected to a steering wheel of the transport vehicle, wherein the transport statistics include data relating to at least a hard turn of the transport vehicle;
   calculating, using the at least a processor, carbon emissions data based on the operation data;
   classifying, using the at least one processor, the carbon emissions data to one or more carbon emissions groups using a carbon emissions machine-learning model;
   comparing, using the at least one processor, the carbon emissions data in the one or more carbon emissions groups to a preconfigured operational threshold for each of the one or more carbon emissions groups; and
   displaying, using the at least one processor, an alert related to the carbon emissions data as presentation content, as a function of the comparison.

9. The method of claim 8, wherein the alert comprises a plurality of actions which caused the carbon emissions data to exceed the preconfigured operational threshold.

10. The method of claim 8, further comprising:
   receiving, using the at least one processor, instructions on the presentation content for carbon emissions data.

11. The method of claim 10, wherein the instructions comprise displaying the presentation content a scope as ranges breakdown of the carbon emissions data.

12. The method of claim 8, wherein the carbon emissions groups comprise one or more magnitudes of carbon contributions.

13. The method of claim 8, wherein displaying the alert comprises displaying the alert on a mobile display device using a network.

14. The method of claim 8, further comprising:
   generating, using the at least one processor, the preconfigured operational threshold using a threshold machine-learning model.

* * * * *